United States Patent
Thiessen

(10) Patent No.: US 11,911,937 B2
(45) Date of Patent: Feb. 27, 2024

(54) METHOD OF POST MANUFACTURE PROCESSING OF 3D PRINTED PARTS

(71) Applicant: Robert Thiessen, Calgary (CA)

(72) Inventor: Robert Thiessen, Calgary (CA)

( * ) Notice: Subject to any disclaimer, the term of this patent is extended or adjusted under 35 U.S.C. 154(b) by 312 days.

(21) Appl. No.: 17/011,718

(22) Filed: Sep. 3, 2020

(65) Prior Publication Data
US 2022/0063152 A1 Mar. 3, 2022

(51) Int. Cl.
*B29C 64/30* (2017.01)
*B29C 44/12* (2006.01)
*B33Y 40/20* (2020.01)
*B29K 105/00* (2006.01)
*B29K 105/04* (2006.01)

(52) U.S. Cl.
CPC .......... *B29C 44/1209* (2013.01); *B29C 64/30* (2017.08); *B33Y 40/20* (2020.01); *B29K 2105/0097* (2013.01); *B29K 2105/04* (2013.01)

(58) Field of Classification Search
CPC .... B29C 44/12–09; B29C 64/30; B33Y 40/20
USPC ....................................................... 264/46.6
See application file for complete search history.

(56) References Cited

FOREIGN PATENT DOCUMENTS

| JP | 2009196234 A | * | 9/2009 | |
|---|---|---|---|---|
| KR | 1813654 B1 | * | 12/2017 | ............... B05D 1/18 |
| WO | WO-2015168482 A1 | * | 11/2015 | ............... C08J 9/32 |

* cited by examiner

*Primary Examiner* — Jeffrey M Wollschlager
*Assistant Examiner* — Xue H Liu
(74) *Attorney, Agent, or Firm* — Finch & Maloney PLLC

(57) ABSTRACT

A method of post manufacture processing of 3D printed parts involves a step of forming at least one treatment aperture through an exterior shell of a 3D printed part to provide access to a lattice of multiple layers of extruded thermo-plastic filaments within a hollow cavity of the part. The method involves a step of inserting a stabilizing substance that flows before it is set and then hardens when set through the at least one treatment aperture into the hollow cavity of the part. The method involves a step of coating the lattice with the stabilizing substance to fill spaces between the multiple layers and between individual thermo-plastic filaments, such that, when set, the stabilizing substance fixes the multiple layers of extruded thermo-plastic filaments of the lattice in position. The method reinforces and stabilizes the internal lattice structure of the part, without significantly adding material or increasing manufacturing cost.

15 Claims, 3 Drawing Sheets

METHOD OF POST MANUFACTURE PROCESSING OF 3D PRINTED PARTS

FIELD

There is described a method of post manufacturing processing of 3D printed parts to improve product quality.

BACKGROUND

Parts manufactured by 3D printers, generally, and Fused Deposition Modelling (FDM) printers, in particular, are vulnerable to issues associated with material weakness and unacceptably high levels of porosity.

With few exceptions, FDM 3D printing does not create solid parts. Materials are laid down in a lattice or honeycomb structure to "fill" and construct spaces inside the part. This sparse filled interior can consist of a small amount of material relative to the space. 15% to 30% infill is normal. The lattice is, typically, laid down in a crosshatched rectangular pattern of extruded thermo-plastic filaments laid down individually and bonded together in the melting, extruding, and cooling process, as materials are deposited. This bond is typically prone to fracturing and poor adhesion between individual filaments and layers.

SUMMARY

There is provided a method of post manufacture processing of 3D printed parts. The method involves a step of forming at least one treatment aperture through an exterior shell of a 3D printed part to provide access to a lattice of multiple layers of extruded thermo-plastic filaments within a hollow cavity of the part. The method involves a step of inserting a stabilizing substance that flows before it is set and then hardens when set through the treatment aperture into the hollow cavity of the part. The method involves a step of coating the lattice with the stabilizing substance to fill spaces between the multiple layers and between individual thermo-plastic filaments, such that, when set, the stabilizing substance fixes the multiple layers of extruded thermo-plastic filaments of the lattice in position.

The method, as described above, strengthens the 3D printed part by fixing the multiple layers and the individual thermos-plastic filaments together. This has the additional beneficial effect of decreasing the porosity of the part.

In initial experiments involves pouring glue or resin through the treatment aperture and turning the part by hand to coat the lattice. This could be done on an automated basis by rotating the part, to use centrifugal force. However, a preferred method of coating the lattice will hereinafter be described and claimed which involves creating a pressure differential to coat the lattice with the stabilizing substance. Resins, glues, expanding foam resins and liquid casting polymers have all been successfully used as the treating substance.

When the pressure differential method was used to distribute a treating substance, the internal lattice structure of the part was reinforced and stabilized, without significantly adding material or increasing manufacturing cost. The part was also waterproof, since all internal surfaces and cavities were filled with the treating substance. However, the treating substance tended to be extruded through pores in the exterior surface of the part, requiring some clean up. It is, therefore, recommended that, as a pre-treatment step, the exterior surface of the part be treated to fill all pores and fracture in order to make the exterior surface of the part air and water tight.

An effective pre-treatment process has been to saturate the atmosphere around the part with an aerosol or vaporized resin or glue, and then place the hollow cavity of the part under vacuum to draw the resin saturated air into the hollow cavity of the part until the pores and fractures in the exterior surface of the part are filled.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A method of post manufacturing processing of 3D printed parts will now be described with reference to FIG. 1 through FIG. 4.

At a minimum, the method involves a step of forming at least one treatment aperture through an exterior shell of a 3D printed part to provide access to a lattice of multiple layers of extruded thermo-plastic filaments within a hollow cavity of the part. The method also involves inserting a stabilizing substance that flows before it is set and then hardens when set through the treatment aperture into the hollow cavity of the part. The method also involves coating the lattice with the stabilizing substance to fill spaces between the multiple layers and between individual thermos-plastic filaments. When set, the stabilizing substance fixes the multiple layers of extruded thermo-plastic filaments of the lattice in position, thereby reinforcing and stabilizing the internal lattice structure of the part, without significantly adding material or increasing manufacturing cost. The method also waterproofs the part, since all internal surfaces and cavities are filled with the treating substance.

By coating the lattice with a stabilizing substance, such as glue or resin, the individual filaments of material become "frozen" or locked with respect to each other at every intersection or crossing. Any excess stress loads placed on any one filament is thereby distributed to all of the filaments intersecting its path, simultaneously. This provides much greater strength, while adding very little in terms of material, or additional mass.

The best known mode will now be described, including a pre-treatment for the exterior shell of the part.

Figure 1:
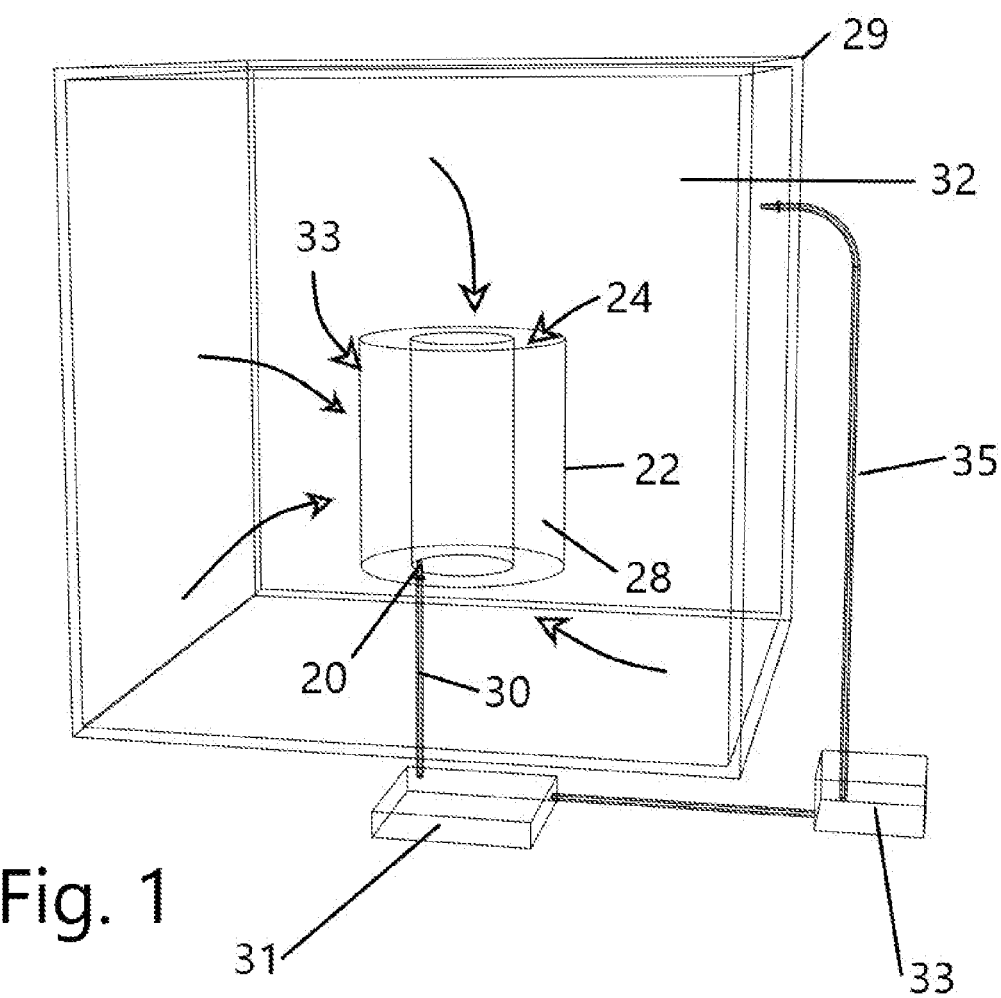
FIG. 1 is a side elevation view, in section, of a part undergoing an exterior shell sealing treatment.

Referring to FIG. 1, the method involves first pre-treating an exterior shell 22 of a 3D printed part 24 to seal any pores (not visible without magnification) and fractures (not visible without magnification) in exterior shell 22.

Figure 3:
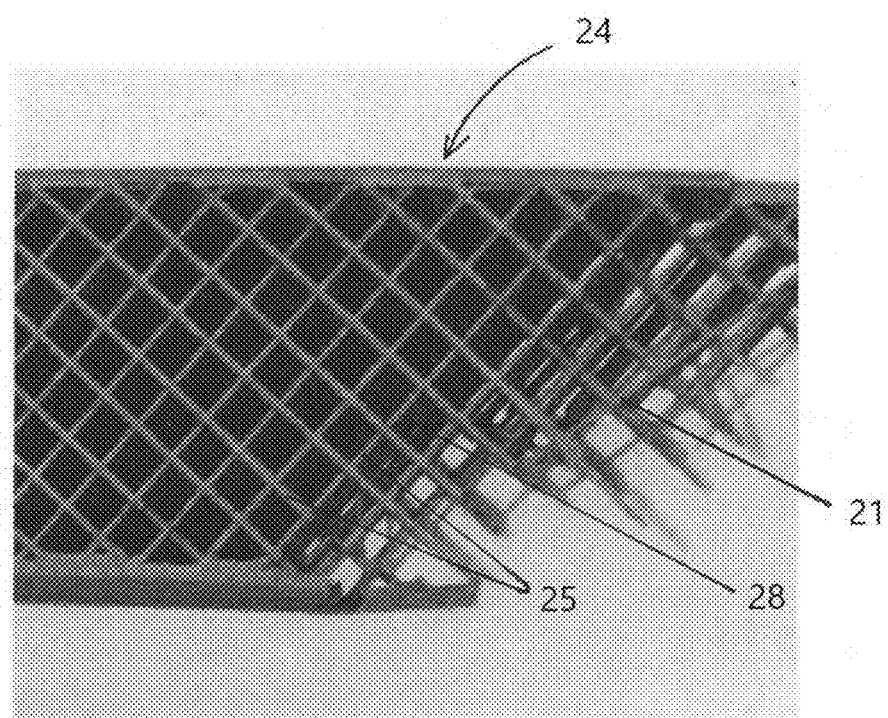
FIG. 3 is a detailed top plan view, in section, of the internal lattice of the part of FIG. 1 and FIG. 2.
Figure 4:
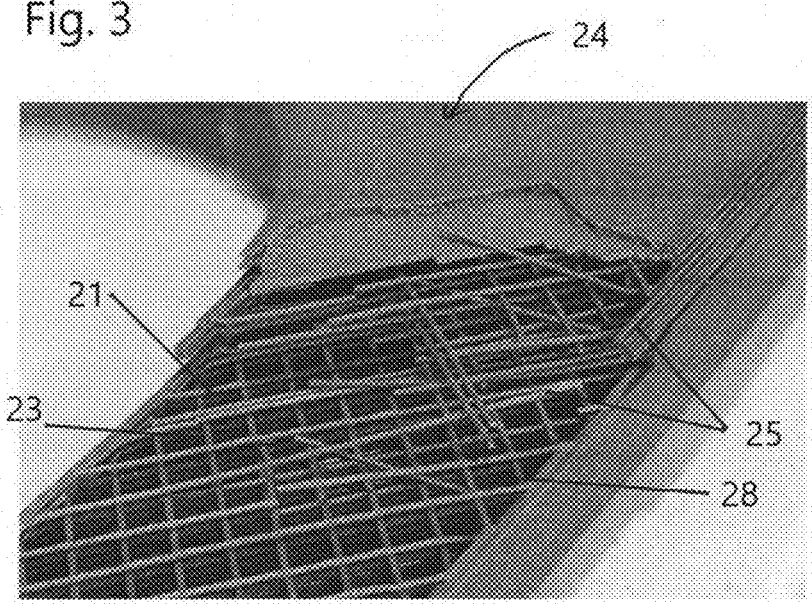
FIG. 4 is a detailed side elevation view, in section, of the part of FIG. 3, showing the multi-layered structure of the internal lattice.

This pre-treatment process first requires forming a treatment aperture 20 through exterior shell 22 of part 24. Referring to FIG. 3 and FIG. 4, the purpose of forming treatment apertures is to provide access to a lattice 21 of multiple layers 23 of extruded thermo-plastic filaments 25 within a hollow cavity 28 of part 24.

Referring to FIG. 1, part 24 is placed within a containment vessel 29. Fluids lines 30 are then connected to treatment aperture 20 of part 24 and to a vacuum pump/compressor 31. Differential pressure created by vacuum pump/compressor 31 is used to pump aerosol or vaporized resin 33 or glue into containment vessel 29 through secondary fluid lines 35.

The pores and fractures in exterior shell 22 of part 24 are treated by first saturating the atmosphere 32 around part 24 with the aerosol or vaporized resin or glue, represented by arrows 33. Vacuum pump/compressor 31 connected to fluid lines 30 is activated in order to place hollow cavity 28 of part 24 under partial vacuum. The vacuum within hollow cavity 28 then draws the resin or glue saturated air (as represented by arrows 33) through the pores and fractures of exterior shell 22 into hollow cavity 28. As this continues, the pores and fractures in exterior shell 22 of part 24 become filled with resin or glue, thereby rendering exterior shell 22 air tight and water tight. This concludes the pre-treatment process of sealing any pores and fractures in exterior shell 22.

FIG. 1 illustrates a preferred application of the pre-treatment process whereby part 24 is placed in a controlled environment (containment vessel 29) and the vaporized resin or glue is delivered by a secondary pump 33 and secondary fluid lines 35. However, a controlled environment is not an essential element of this process. Exterior shell 22 can be treated with a brush on resin or a sprayed on resin. There is a danger with other exterior treatments that some pores or fractures could be missed. The reason this method of treatment is preferred is that it is thorough. By monitoring pressure levels and air flow, one can determine whether there is still flow through some pores and fractures or whether every objective indication is that the pores and fractures have been blocked.

After exterior shell 22 has been sealed, the method then involves filling hollow cavity 28 with a stabilizing substance. With the pores and fractures in exterior shell 22 sealed, the preferred stabilizing substance is an expanding foam resin. The foam resin is to a degree self-pressurizing as it expands and adds a minimal amount of additional material, measured by weight, to the final part. It flows before it is set and then hardens when set. If weight is not a concern and maximum density and strength are prioritized, then a liquid casting polymer can be used as a stabilizing substance, which flows before it is set and then hardens to a dense solid when set.

Figure 2:
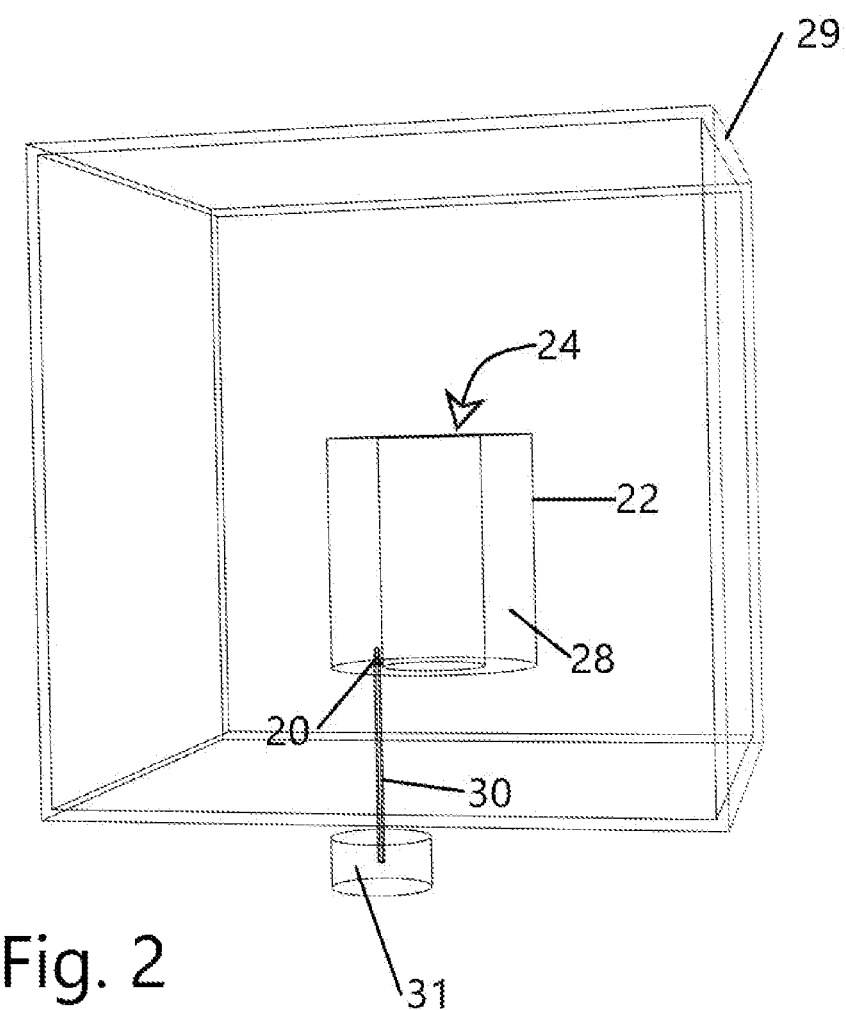
FIG. 2 is a side elevation view, in section, of a part undergoing an internal lattice strengthening treatment.

Referring to FIG. 2, a pressure differential is created within hollow cavity 28 of part 24. In order to create this pressure differential vacuum pump/compressor 31 is used to create a partial vacuum within hollow cavity 28 of part 24. Then the system is charged with an expanding foam resin and vacuum pump/compressor 31 deactivated. The vacuum within hollow cavity 28 draws the foam resin, the liquid casting polymer or other stabilizing substance up through fluid lines 30 into part 24. As hollow cavity becomes depressurised, exposure to atmospheric gases causes the stabilizing substance to expand or fill spaces within part 24.

Referring to FIG. 3 and FIG. 4, by following this method only a very small amount of material is added to part 24, while the majority of interior space is now made up of encapsulated or trapped gas (foam filling). During the expansion, the foam coats all interior surfaces of part 24 with resin, including the thousands of cross-hatched strands of filament 25 which make up the sparse-fill. The foaming action is critical to even distribution of material. As the resin sets, the individual strands of resin coated plastic filament 25 become fixed relative to each other, relative to layers 23 and part 24 as a whole. Drying to a hard finish, the coated plastic structures of the interior are now "frozen" or stabilized at every connection, as well as strengthened along all surfaces. The part now has a reinforced and stabilized internal lattice 21 structure (the infill itself has been stabilized and reinforced) without adding much in terms of material or cost. It is also waterproof since all internal surfaces and cavities are filled with foam.

Alternatively, a similar result can be achieved using non-foaming substances such as urethane casting polymers as the stabilizing substance in order to create solid parts. In that case the casting polymer fills part 24 with liquid polymer. Once again, as the casting polymer sets, the individual strands of polymer saturated plastic filament 25 become fixed relative to each other, relative to layers 23 and part 24 as a whole. Drying to a hard finish, the saturated plastic structures of the interior are now "frozen" or stabilized at every connection, as well as strengthened along all surfaces.

A favourable configuration for the 3D printer used to furnish parts for the above described method, would focus on surface quality and accuracy of the parts, and not on the strength or density, since that can, and will, be manipulated in the post manufacturing processing. Generally speaking, it's more economical printing 3D parts using less material, since time and materials make up the bulk of manufacturing cost for 3D printing. This reduction in time-to-print and materials used is usually accomplished by lowering the printed infill percentage. However, the normal trade-off for doing so is a loss of strength, and to a lesser degree, surface quality of the parts. With respect to method, lowering the infill percentage in the initial 3D printed part actually improves the ability to flow materials into all sections of the parts interior spaces. It's also advantageous to use the Rectilinear, or Rectangular infill option for the 3D print, rather than another infill pattern such as Triangular, or Hexagonal. Once again, this fill pattern favours and facilitates the flow of materials into all sections of the 3D parts interior spaces.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A method of post manufacture processing of 3D printed parts, comprising:
   forming at least one treatment aperture through an exterior shell of a 3D printed part to provide access to an internal lattice of multiple layers of extruded thermo-plastic filaments within a hollow cavity of the part;
   inserting a stabilizing substance that flows before it is set and then hardens when set through the at least one treatment aperture into the hollow cavity of the part; and
   coating the lattice with the stabilizing substance to fill spaces between the multiple layers and between individual filaments of said extruded thermo-plastic filaments, such that, when set, the stabilizing substance fixes the multiple layers of extruded thermo-plastic filaments of the lattice in position.

2. The method of claim 1, wherein the stabilizing substance is inserted through the at least one treatment aperture by connecting fluids lines to the at least one treatment aperture of the part.

3. The method of claim 2, wherein the coating of the lattice is accomplished by creating a pressure differential between the hollow cavity of the part.

4. The method of claim 3, wherein the pressure differential is created by forming a partial vacuum within the hollow cavity of the part.

5. The method of claim 3, wherein the pressure differential is created by pressurizing the hollow cavity of the part.

6. The method of claim 1, wherein the stabilizing substance is a resin.

7. The method of claim 1, wherein the stabilizing substance is a glue.

8. The method of claim 6, wherein the stabilizing substance is an aerosol or vaporized resin.

9. The method of claim 7, wherein the stabilizing substance is an aerosol or vaporized glue.

10. The method of claim 6, wherein the stabilizing substance is an expanding foam resin.

11. The method of claim 1, wherein the stabilizing substance is a polymer casting material.

12. The method of claim 3, wherein, as a pre-treatment step, the exterior shell of the part is treated to fill all pores and fracture in order to make the exterior shell of the part air and water tight.

13. The method of claim 12, wherein the pre-treatment step is comprised of:
saturating the atmosphere around the part with a vaporized resin or glue; and
placing the hollow cavity of the part under vacuum to draw the resin saturated air into the hollow cavity of the part until the pores and fractures in the exterior shell of the part are filled.

14. A method of post manufacture processing of 3D printed parts, comprising:
treating an exterior shell of the part to fill all pores and fracture in order to make the exterior shell of the part air and water tight;
forming at least one treatment aperture through the exterior shell to provide access to an internal lattice of multiple layers of extruded thermo-plastic filaments within a hollow cavity of the part;
connecting fluids lines to the at least one treatment aperture of the part;
inserting a stabilizing substance, that flows before it is set and then hardens when set, through the at least one treatment aperture through the fluid lines into the hollow cavity of the part; and
creating a pressure differential within the hollow cavity of the part and using the pressure differential to coat the lattice with the stabilizing substance to fill spaces between the multiple layers and between individual filaments of said extruded thermo-plastic filaments, such that, when set, the stabilizing substance fixes the multiple layers of extruded thermo-plastic filaments of the lattice in position.

15. A method of post manufacture processing of 3D printed parts, comprising:
forming at least one treatment aperture through an exterior shell of a 3D printed part to provide access to an internal lattice of multiple layers of extruded thermo-plastic filaments within a hollow cavity of the part;
connecting fluid lines to the at least one treatment aperture of the part;
treating pores and fractures in the exterior shell of the part by:
saturating the atmosphere around the part with an aerosol or vaporized resin or glue; and
using the connecting fluid lines to place the hollow cavity of the part under partial vacuum to draw the resin or glue saturated air through the pores and fractures of the exterior shell into the hollow cavity of the part until the pores and fractures in the exterior shell of the part become filled with resin or glue, thereby rendering the exterior shell air tight and water tight;
inserting a stabilizing substance in the form of an expanding foam resin that flows before it is set and then hardens when set through the at least one treatment aperture through the fluid lines into the hollow cavity of the part; and
creating a pressure differential within the hollow cavity of the part and using the pressure differential to coat the lattice with the expanding foam resin to fill spaces between the multiple layers and between individual filaments of said extruded thermo-plastic filaments, such that, when set, the expanding foam resin stabilizing substance fixes the multiple layers of extruded thermo-plastic filaments of the lattice in position.

\* \* \* \* \*